United States Patent [19]

Schwarz

[11] Patent Number: 5,776,562
[45] Date of Patent: Jul. 7, 1998

[54] TRANSPARENT WEB PLATE

[76] Inventor: Dietrich Schwarz, Reichsgasse 61, 7000 Chur, Switzerland

[21] Appl. No.: 693,047
[22] PCT Filed: Feb. 24, 1995
[86] PCT No.: PCT/CH95/00041
§ 371 Date: Aug. 16, 1996
§ 102(e) Date: Aug. 16, 1996
[87] PCT Pub. No.: WO95/22886
PCT Pub. Date: Aug. 31, 1995

[30] Foreign Application Priority Data

Feb. 28, 1994 [CH] Switzerland .............. 587/94

[51] Int. Cl.$^6$ .................................................. E06B 3/24
[52] U.S. Cl. ........................ 428/34; 428/120; 428/178; 428/188; 428/212; 52/786.1; 52/786.13
[58] Field of Search ................ 428/34, 178, 188, 428/120, 212; 52/786.13, 786.1

[56] References Cited

U.S. PATENT DOCUMENTS

| 4,399,641 | 8/1983 | Schloemer et al. | 428/278 |
| 4,443,987 | 4/1984 | Erb | 428/34 |
| 4,898,153 | 2/1990 | Sherwood | 126/448 |
| 5,294,472 | 3/1994 | Arnold et al. | 428/178 |
| 5,348,790 | 9/1994 | Ben-Zvi et al. | 428/178 |

FOREIGN PATENT DOCUMENTS

| 0 054 856 | 6/1982 | European Pat. Off. . |
| 0 109 388 | 5/1984 | European Pat. Off. . |
| 0 150 534 | 8/1985 | European Pat. Off. . |
| 0 477 687 | 4/1992 | European Pat. Off. . |
| 2 508 555 | 12/1982 | France . |
| 37 04 906 | 10/1987 | Germany . |
| 92 05 226 | 8/1993 | Germany . |
| 84/01687 | 5/1984 | WIPO . |

*Primary Examiner*—Donald Loney
*Attorney, Agent, or Firm*—Browdy and Neimark

[57] ABSTRACT

The web plate consists of two panes (1) and a plurality of webs (2) interconnecting the panes (1). The width of the webs is substantially greater than the spacing between the webs. The longitudinal extension of the webs (2) is horizontal. The webs (2) form an acute angle ($\alpha$) with the panes (1). The cross section on the lower side of some of the webs (2) is saw-tooth shaped. This ensures that, when the sun is high in the sky, most of the sunlight is deflected outwards. The narrow horizontal cavities (3) between the webs (2) keep heat losses by convection to a minimum, thus ensuring a very good thermal insulation.

18 Claims, 2 Drawing Sheets

TRANSPARENT WEB PLATE

BACKGROUND

Transparent web plates, made of plastic, are known for the insulation of greenhouses or hotbeds. They have two transparent panes disposed at a small distance from each other and connected to each other by several webs. In the case of vertical walls, the webs are arranged vertically, in order to allow for a drainage, if needed, of condensed water.

SUMMARY OF THE INVENTION

The aim of the present invention is to enhance the thermal insulation properties of such transparent web plates. This task is achieved by the combination of the characteristics given in the patent claims.

The thermal convection within the cavities is drastically reduced by making the webs substantially wider than the distance between neighbouring webs, and by a horizontal arrangement of the webs in the built-in state. The web plate according to the invention therefore allows for a considerably superior thermal insulation, compared to conventional web plates.

BRIEF DESCRIPTION OF DRAWINGS

In the following, some exemplary embodiments of the invention are explained with reference to the drawing, wherein.

DETAILED DESCRIPTION OF EMBODIMENTS

Figure 1:
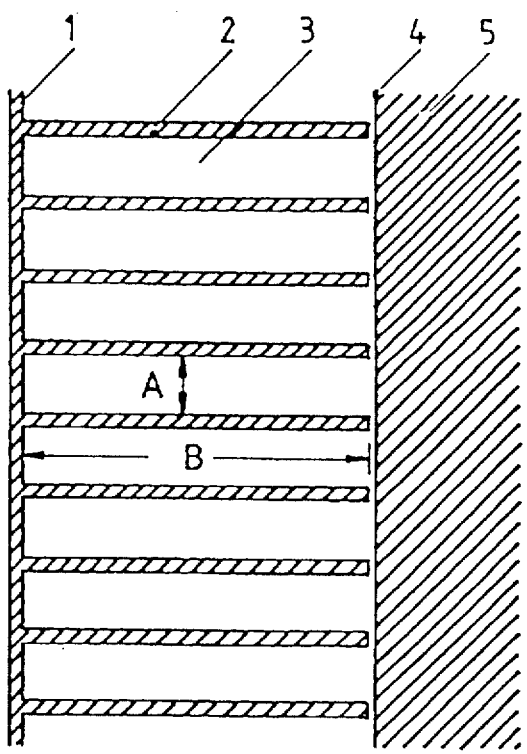
FIG. 1 shows a vertical cross section through a web plate mounted on a vertical wall.

The web plate according to FIG. 1 comprises a transparent pane 1 from which a multitude of webs 2 stand off. The width B of the webs is substantially greater than the distance A between neighbouring webs. Preferably, the width B is 40–200 mm. The web plate is mounted with the free edges of the webs 2 as close as possible to a wall 5, the outside 4 of which is coated with a light absorbing material, e.g. painted in black. In the built-in state, the longitudinal dimension of the webs 2 runs horizontally. Because convection in the flat, horizontally disposed cavities 3 between the webs 2 is almost impossible, a very good thermal insulation is achieved. The distance A between the webs should be as large as to achieve an optimum of minimal advection and a minimal number of webs 2, that through the web plate the thermal conduction is minimal and the total energy transmission is maximal. For a maximum of total energy transmission, the web plate must further be made with the minimal number of statically necessary panes. For this reason, the embodiment according to FIG. 1 does not comprise an interior terminal pane. The web plate can be made of transparent plastic or of glass. Preferably, it is extruded as a single piece.

Figure 2:
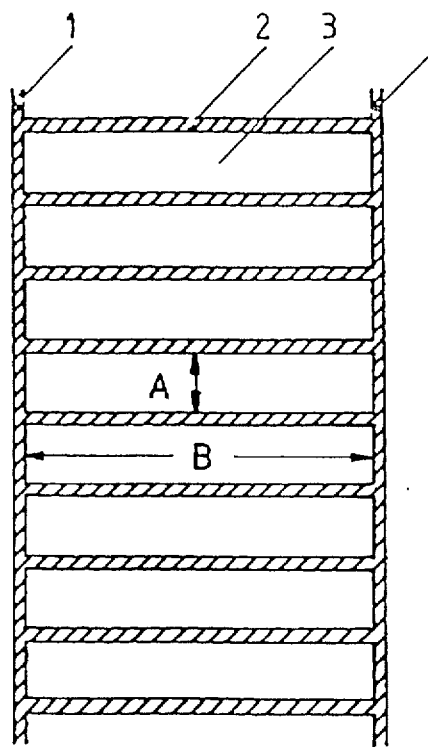
FIGS. 2 and 3 show two further embodiments of the web plate.

In the embodiment according to FIG. 2, the webs 2 are joined on both sides to each a pane 1, thus the cavities 3 are closed. This embodiment is suitable for the insulation of a wall as well as for daylight illumination of rooms, e.g. for greenhouses. In the embodiment according to FIG. 3, the inner pane 1 carries further webs 2 with the same dimensions as in the embodiment according to FIG. 1.

Figure 4:
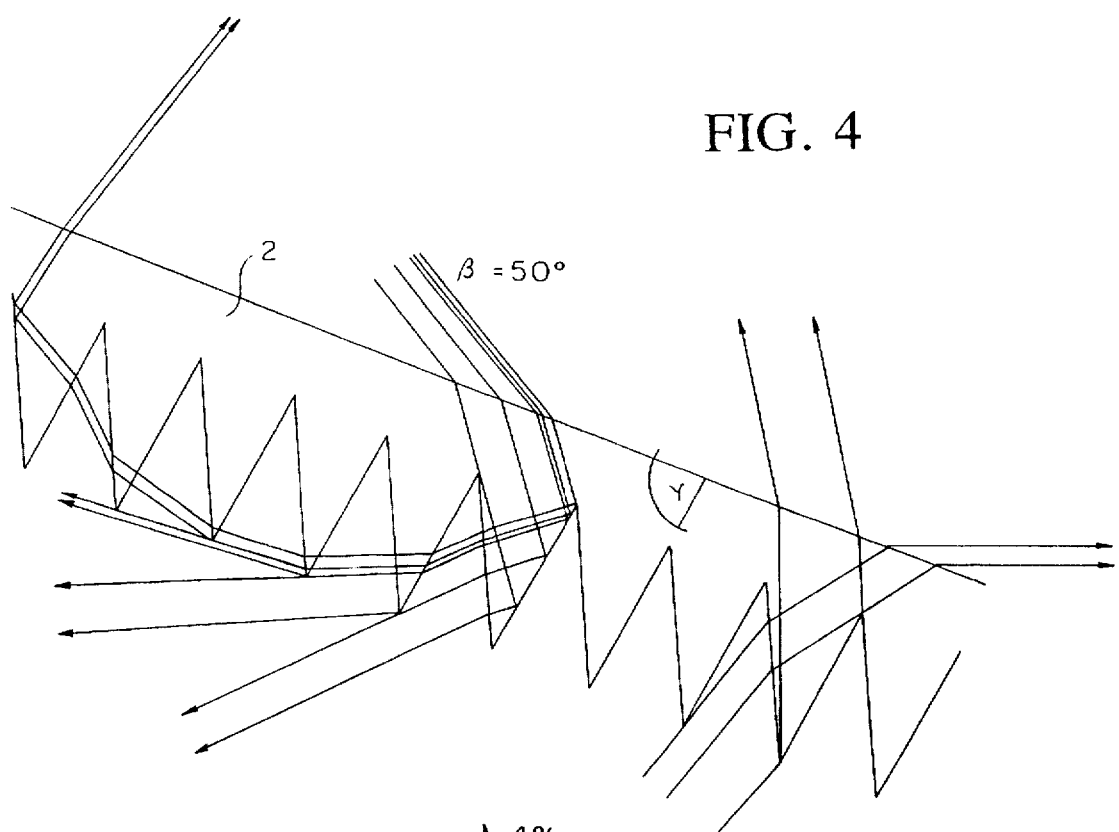
FIGS. 4 and 5 show a fourth embodiment.
Figure 5:
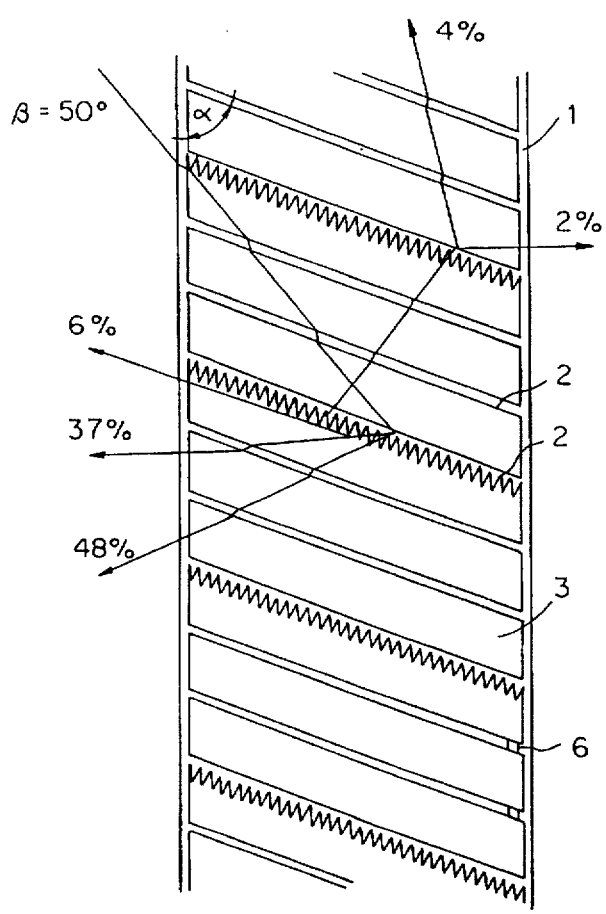

In the embodiments according to FIGS. 4 and 5, the webs 2 can form an acute angle a with the pane 1. The angle $\alpha$ is chosen such that, on south orientation of the wall front, the direction of the sun rays during winter is more or less parallel to the web plane. Some of the webs 2 have on their lower side a saw-tooth shaped, i.e. a periodic-prismatically shaped cross section. Herewith is achieved that during the summer months, when the sun is high and the incident angle $\beta$ of the sun rays is e.g. 50°, most of the incident radiation is deflected outwards through refraction. A shading of the web plate or of the wall 5 during summer is therefore not needed. The angle $\alpha$ of the webs determines at which incident angle $\beta$ the sun rays will penetrate the web plate unhindered. For this reason, the webs are oriented according to the solar incident angles during the heating period. By means of the angles $\gamma$ of the prisms which are disposed on the webs, it can be determined, according to FIG. 4, how much the sun rays are deflected per web 2. This saw-tooth shaped termination may be very fine. As a result, almost no weakenings of the cross section of the webs 2 arise. Altogether, it can therefore be determined by a choice of the distance A, the angle $\alpha$, the angle $\gamma$ of the prisms and the refractive index of the material, at which incident angles $\beta$ the sun rays will penetrate the web plate, and at which incident angles $\beta$ the sun rays are partially and at which incident angles $\beta$ the sun rays are almost totally deflected to the outside again (FIG. 5). In this way it is possible to optimally design the web plate.

The refraction of light, and therefore the deflection to the outside of sun rays when the sun is high, can also be achieved by an unilateral prismatic section of the panes 1.

To allow the condensed water, which accumulates in the web plate, to drain in spite of the horizontally disposed webs, the webs 2 can be provided with openings 6 at their lower edge. For this reason, it makes sense to slightly incline the webs 2, even when they are not exposed to direct sun radiation. With the aid of coatings, which prevent the formation of condensation water droplets on the entire surface of the web plate through spreading, the reflection of light can be reduced. This results in an increase of the total energy transmission.

Figure 3:
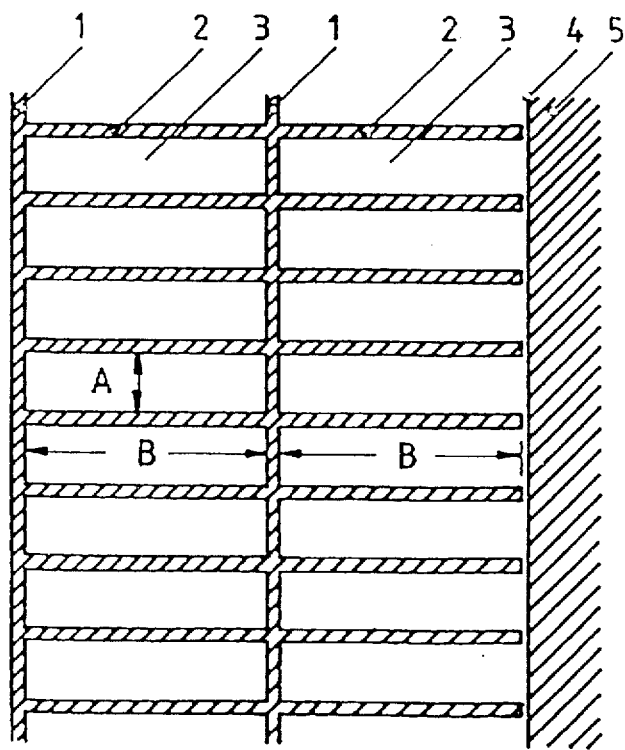

As follows from the drawing, the ratio of width B of the free space between the panes 1 and webs 2 to A between neighbouring webs 2 is about 4:1 for the embodiment according to FIG. 3. For the other embodiments, this ratio is larger.

I claim:

1. Light-transparent web plate, comprising at least one transparent pane (1), from which project a plurality of webs (2), wherein the ratio of the width (B) of an uninterrupted space between the webs (2) to the distance (A) between neighboring webs (2) is at least 4:1 and wherein all of the webs are transparent and parallel to each other.

2. Web plate according to claim 1, wherein the width (B) of the webs (2) is greater than 40 mm.

3. Web plate according to one of claim 1, wherein the webs (2) are arranged between two mutually parallel transparent panes (1).

4. Web plate according to claim 3, wherein further webs (2) having a width (B) greater than the web spacing (A) project from that one of the panes (1) which faces the wall (5) to be insulated.

5. Web plate according to claims 1, wherein the webs (2) form an acute angle ($\alpha$) with the pane (1) or the panes (1), respectively.

6. Web plate according to claim 1, wherein several webs (2) have on one side a saw-tooth shaped cross section.

7. Web plate according to claim 1, wherein the panes, or at least one pane or portions thereof, have or has on one side a saw-tooth shaped cross section.

8. Web plate according to claim 1, wherein the webs (2) have openings (6) for the drainage of condensed water.

9. A light-transparent web plate, comprising at least one vertically disposed transparent pane (1), from which a plurality of substantially parallel webs (2) project substantially horizontally, wherein the width dimension (B) of extension from said pane (1) of said webs (2) is substantially greater than the height (A) of a free space between adjacent webs (2) and wherein all of the webs are parallel to each other.

10. Web plate according to claim 9, wherein the width (B) of the webs (2) is greater than 40 mm.

11. Web plate according to claim 9, wherein the webs (2) are arranged between two mutually parallel transparent panes (1).

12. Web plate according to claim 11, wherein further webs (2) having a width (B) greater than the web spacing (A) project from that one of the panes (1) which faces the wall (5) to be insulated.

13. Web plate according to claim 9, wherein the webs (2) have openings (6) for the drainage of condensed water.

14. Web plate according to claim 9, wherein the ratio of the width (B) of the webs (2) to the distance (A) between neighboring webs is at least 4:1.

15. Web plate according to claim 4, wherein the webs (2) form an acute angle ($\alpha$) with the pane (1) or the panes (1), respectively, and wherein the planes of all webs are parallel to each other.

16. Web plate according to claim 3, wherein the webs (2) form an acute angle ($\alpha$) with the pane (1) or the panes (1), respectively, and wherein the planes of all webs are parallel to each other.

17. Web plate according to claim 16, wherein several webs (2) have on one side a saw-tooth shaped cross section.

18. Web plate according to claim 2, wherein the ratio of the width (B) of the webs (2) to the distance (A) between neighboring webs is at least 4:1.

* * * * *